Feb. 9, 1965    J. L. DE CLERK ET AL    3,168,860
AUTOMATIC EXPOSURE CONTROLLED FILM PRINTER
Filed March 29, 1962    3 Sheets-Sheet 1

Joseph L. DeClerk
Edward P. Kennedy (Deceased)
Domenic L. LaBanca
INVENTORS.

Feb. 9, 1965       J. L. DE CLERK ET AL       3,168,860
AUTOMATIC EXPOSURE CONTROLLED FILM PRINTER
Filed March 29, 1962                         3 Sheets-Sheet 3
Fig. 3
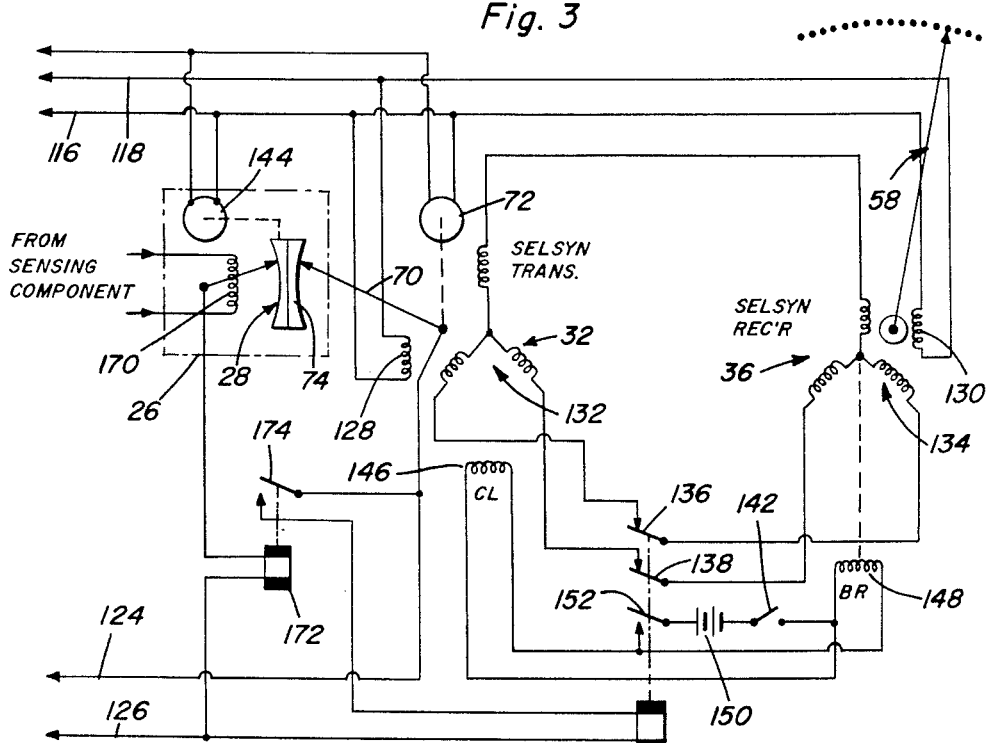
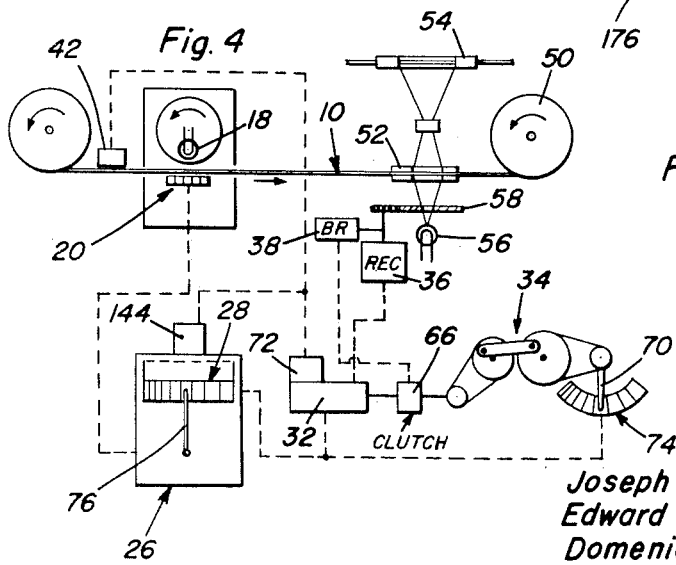
Fig. 5
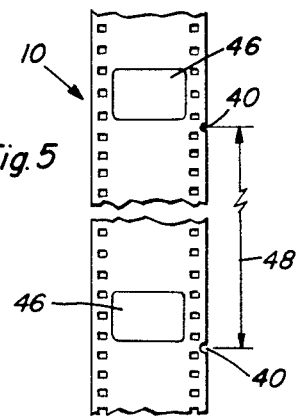
Joseph L. DeClerk
Edward P. Kennedy (Deceased)
Domenic L. LaBanca
INVENTORS.
BY *Clarence A. O'Brien*
*and Harvey B. Jackson*
Attorneys United States Patent Office 3,168,860
Patented Feb. 9, 1965

3,168,860
AUTOMATIC EXPOSURE CONTROLLED FILM PRINTER
Joseph L. De Clerk, 673 W. Front St., Red Bank, N.J.; Edward P. Kennedy, deceased, late of West End, N.J., by W. Robert Warwick, administrator, 434 Broadway, Long Branch, N.J.; and Domenic L. La Banca, 28 Girard Ave., West Long Branch, N.J.
Filed Mar. 29, 1962, Ser. No. 195,014
15 Claims. (Cl. 95—75)

This invention relates to an automatic exposure controlled system adapted for use in connection with motion picture printers having a plural step aperture control mechanism, the system being operative therethrough to produce positive prints of uniform density from image frames on the film having varying opacity.

The control system of the present invention is particularly useful in connection with the printing of positive from the negative image frames of 35 mm. film. Film printers having plural step iris aperture control mechanism for regulating the light exposure in a photographic printing process, are well known in the art. This type of printer apparatus required the exercise of judgement on the part of the operator after viewing the scene on an image frame of the film in order to properly set the exposure control to a compensating $f$ number (iris stop). Accordingly, it is a primary object of the present invention to provide an exposure control system that may be applied to a plural step exposure control of a film printer to more rapidly print and process image frame scenes producing positive prints of uniform density without requiring the judgement of the operator for such purpose.

In accordance with the foregoing object, the system of the present invention features a non-linear plural position scanning control operative to more reliably and effectively utilize information as to the opacity of the film supplied thereto by a film evaluation unit to control a selsyn transmitter and receiver system for correctly positioning the exposure control or shutter mechanism of the printer at the proper setting prior to arrival of the image frame on the firm to be printed at the printing station.

There together with other objects and advantages which will become subsequently apparent reside in the details of construction and operation as more fully hereinafter described and claimed, reference being had to the accompanying drawings forming a part hereof, wherein like numerals referred to like parts throughout, and in which:

FIGURE 3 is a circuit diagram of the signal responsive and scanning components of the control system.

FIGURE 4 is a diagrammatic illustration of the apparatus associated with the system of the present invention.

FIGURE 5 illustrates a portion of the film strip prepared for printing in accordance with the system of the present invention.

Figure 1:
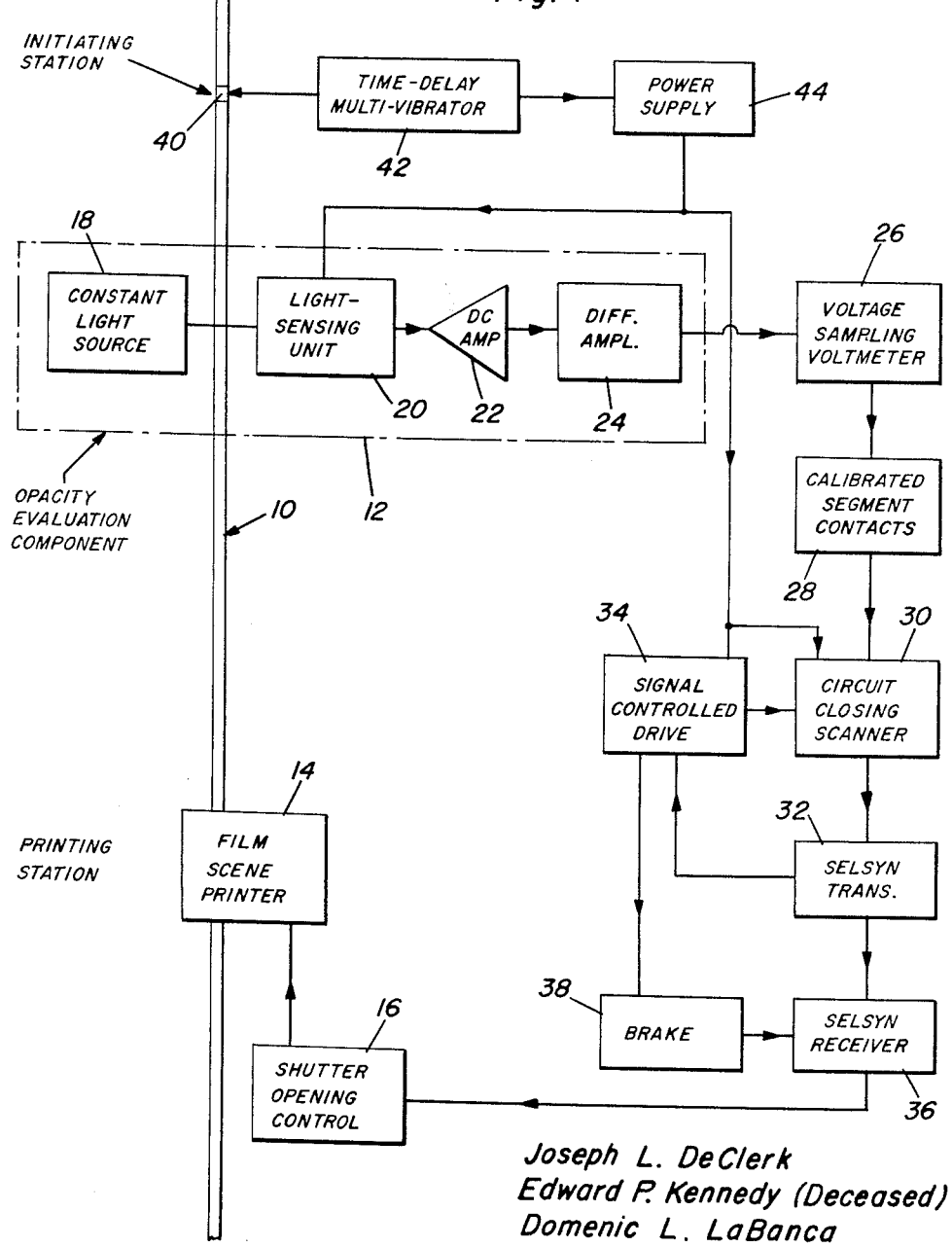
FIGURE 1 is a flow diagram illustrating the operational procedure of the control system of the present invention.

Referring now to the drawings in detail, attention is initially invited toward FIGURE 1 wherein a strip of film generally referred to by reference numeral 10 is evaluated by an opacity evaluation component generally referred to by reference numeral 12 prior to printing of images recorded thereon at the printing station by a film scene printer 14 of the type hereinbefore referred to having a plural step shutter opening control generally referred to by reference numeral 16. A suitable film drive may therefore be associated with the film printer for continuous movement of the film strip 10 therethrough. The control system of the present invention however properly sets the shutter 16 automatically in accordance with film opacity information previously obtained by the opacity evaluation component. The opacity evaluation component therefor includes a constant light source 18 producing a beam of light that traverses film 10 and is sensed by a light sensing unit 20 the output of which will depend upon the intervening degree of opacity of the film emulsion which controls the amount of light passing through the film and reaching the light sensing unit. The output of the light sensing unit 20 is then fed to a D.C. amplifier circuit which in turn supplies an amplified signal to a differential amplifier circuit 24 arranged to produce an output signal only in response to the detection of light passing through image frames on the film 10. The output signal from the amplifier circuit 24 will also be at an energy level reflecting the opacity of the film at the image frame portion being sensed to drive a contact making voltmeter 26. The voltmeter indicator arm is operative during a sampling cycle to assume an angular position which is directly related to the energy level of the output signal from the amplifier 24. The voltmeter is thereby operative to establish a circuit through one of a series of interconnected segment contacts establishing a signal transmitting circuit. The contacts form a plurality of contact ranges calibrated in accordance with the plurality of control settings associated with the shutter opening control of the film printer. The signal transmitted to the calibrated segment contact 28 is therefore transmitted by a circuit closing scanner 30 continuously driven by the rotor of a Selsyn transmitter 32 during a sampling cycle through a signal controlled drive 34. Upon receipt of the signal through the contact, the drive 34 is disengaged to stop the scanner at a position corresponding to the displacement of the voltmeter contact arm. The movement and position so assumed by the scanner is therefore transmitted by the Selsyn transmitter to a Selsyn receiver 36 operatively connected to the shutter opening control 16 for movement thereof between the plurality of setting positions. Upon disengagement of the signal control drive 34, a brake mechanism 38 is also engaged to lock the output of the Selsyn receiver 36 and thereby hold the shutter opening control at its proper setting.

The cycle described hereinbefore, is initiated by a notch 40 on the film 10 arranged to start the sampling cycle as an image frame on the film approaches an evaluation station. Accordingly, a notch actuated switch operating through a time delay multi-vibrator 42 may control a power supply 44 through which the light sensing unit 20 is put into operation in order to perform the opacity evaluation function while at the same time the circuit closing scanner 30 is set into operation through the signal control drive 34. The components of the system are therefore rendered operative for a predetermined sampling period only necessary to perform the control function thereof after which operation ceases. A new cycle of operation is begun each time the notch 40 in the film initiates it.

Referring therefore to FIGURE 5 in particular, it will be observed that the film 10 is prepared in a special manner commensurate with the arrangement of the equipment necessary to carry out the functions of the control system. Accordingly the image frames 46 are spaced apart a predetermined distance 48 to allow detection of opacity by the light sensing unit and automatic setting of the exposure control before the image frame reaches the printing station. Thus, the notches 40 which activates the switch to operate the time delay multi-vibrator 42 to initiate operation, will be properly spaced in relation to and adjacent to the image frames 42.

Referring now to FIGURE 4, one typical example is diagrammatically illustrated of the apparatus necessary to perform the aforementioned functions of the exposure control system. The film 10 properly prepared as hereinbefore indicated, may therefore be continuously driven in any suitable drive mechanism 50 each initiating notch 40 first actuating the initiating control apparatus 42 as an image frame approaches and passes between an exciter lamp constituting the constant light source 18 and an overlapped bank of six silicon solar cells constituting the light sensing unit 20. The image frame on the film 10 subsequently passes through the printing gate 52 in the printer to produce a projected image on the sensitized printing paper in the printing gate 54 of the printer in response to illumination from the projection lamp 56. The illumination is accordingly controlled by the sizes of the aperture in the iris device 58 of the printer. The setting of the iris device 58 is in turn controlled by the output shaft of the Selsyn motor 36. A brake device 38 is connected to the Selsyn motor 36 so as to lock the iris device 58 at its proper setting. The position of the Selsyn motor 36 is controlled by the position of the rotor of Selsyn transmitter 32 which is drivingly connected through a clutch mechanism 66 of a disengageable drive 34 to the scanner contact arm 70. The motor 72 is accordingly associated with the arm 70 for driving the rotor of transmitter 32. The contact arm of the scanner 70 will therefore be stopped at one of the plurality of calibrated contact segments generally referred to by reference numeral 74 each of which is connected to a corresponding contact segment associated with the contact making arm 76 of the voltage sampling volt meter 26 driven by the output from the light sensing unit 20 as hereinbefore indicated. The contact segments 28 are positioned by motor 144 when energized, for contact by arm 76.

Figure 2:
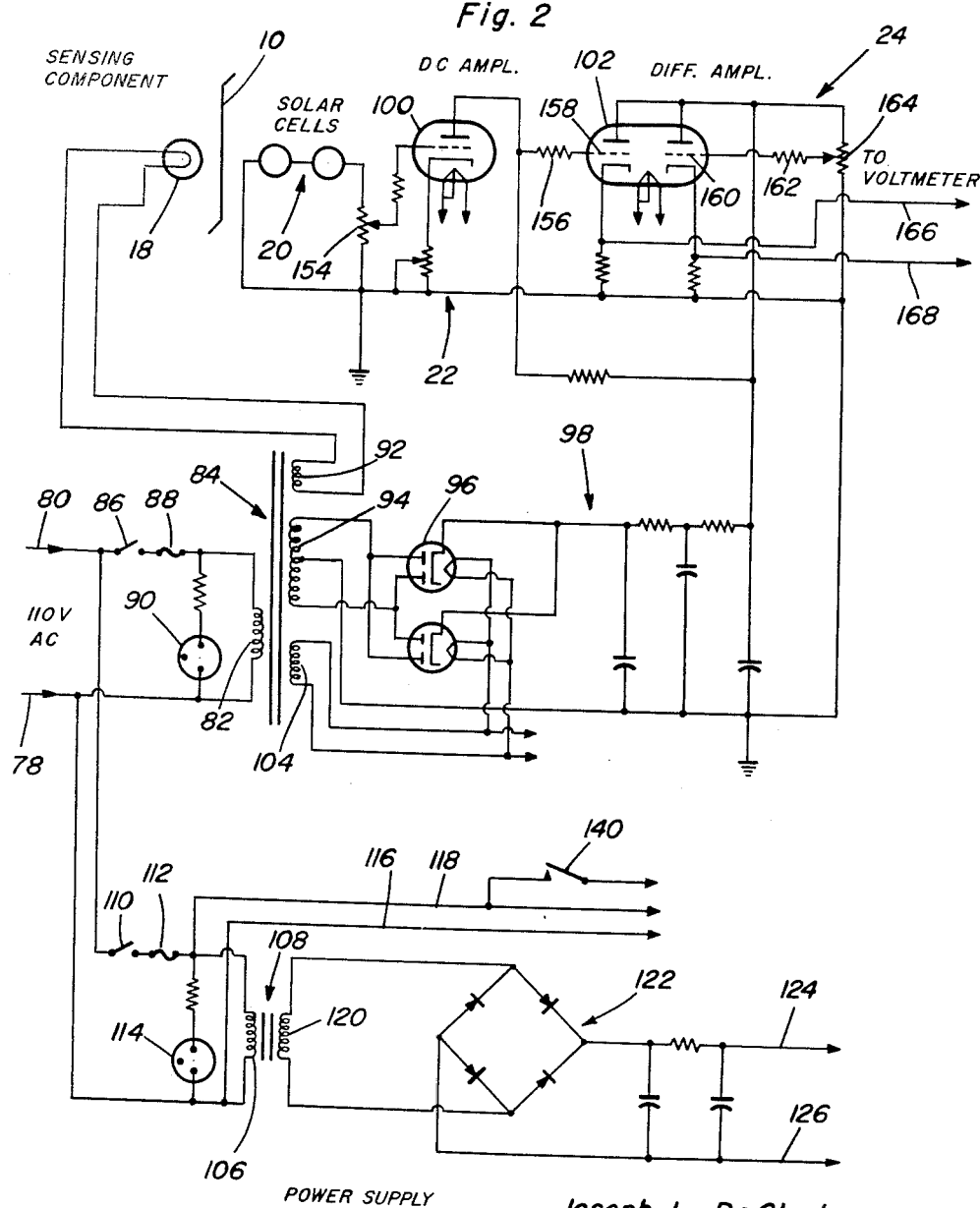
FIGURE 2 is a circuit diagram of the opacity evaluation components and power supply of the exposure control system.

Referring now to FIGURES 2 and 3, the control circuit associated with the apparatus of the present invention that is necessary to perform the described function of the control system will be explained. As shown in FIGURE 2, the power supply is derived from a pair of 110-volt A.C. power lines 78 and 80 connected across the primary winding 82 of transformer 84, through start switch 86 and fuse element 88. Also, connected across the power lines, in series with a resistance, is the pilot lamp 90. The transformer 84 includes a plurality of secondary windings including the winding 92 constituting an A.C. source for the exciter lamp 18. The secondary winding 94 is connected to the plate elements of rectifier tubes 96 in a rectifying and filter circuit generally referred to by reference numeral 98 supplying a D.C. potential to the plate circuit in the D.C. amplifier tube 100 of the D.C. amplifier circuit and the amplifier tube 102 of the differential amplifier circuit 24. The secondary 104 of the transformer 84 supplies current to the heater elements of the rectifier tubes 96 and the amplifier tubes 100 and 102. Also connected across the power lines 78 and 80, is the primary 106 of transformer 108 through the start switch 110 and fuse 112. A second pilot lamp 114 is connected in series with a resistor across the transformer primary 106 to indicate the operating condition thereof. Further, lines 116 and 118 are connected across the primary for supplying A.C. power to components of the system to be hereafter described. The secondary winding 120 of the transformer 108 is connected to a full wave rectifier and filter circuit 122 for supplying D.C. voltage across lines 124 and 126.

Thus, when the starting switches 86 and 110 are closed, the lamp 118 will be energized and operating potential applied to the plate element of the amplifier tubes 100 and 102 in order to condition the opacity evaluation component for operation. At the same time, lines 116 and 118 are connected across the rotor windings 128 and 130 of the Selsyn units 32 and 36 respectively. The units 32 and 36 are of the usual single phase self-synchronizing type having Y induction type stator windings 132 and 134 operatively interconnected with each other through normally closed relay switches 136 and 138. Accordingly, the position of the rotor of unit 32 will be reproduced by the rotor of unit 36. With the energization of the rotor windings 128 and 130, the Selsyn motors will be operative. Thus, when the first film notch 40 actuates a switch and puts the time-delay multi-vibrator 42 into operation, normally opened start switch 86 and 110 and momentary switches 140 and 142 are closed to thereby connect the A.C. power lines 116 and 118 across the motor device 144 for contact of segments 28 by arm 76 of the volt meter 26. The A.C. power lines are also then connected across the motor device 72 for driving of the scanner contact arm 70 so that it may be rotated through the engaged clutch device 66 of the drive 34 that drivingly connects the rotor of unit 32 to the scanner contact arm. The normally engaged clutch 66 is therefore disengaged upon energization of a clutch control solenoid 146 connected in parallel with the brake engaging solenoid 148 of the brake device 38, said solenoids 146 and 148 being energized by a separate source of battery power 150 through the normally opened relay switch 152 and the normally opened momentary switch 142 which is closed to condition the clutch and brake control solenoid for operation. The momentary switches 140 and 142 therefore remain closed long enough to permit evaluation of film opacities.

After initiation of the operating cycle, the image frame on the film 10 passes between the exciter lamp 18 and the silicon photocell unit 20. The amount of light from the exciter lamp is of constant brightness so that the intervening degree of opacity of the film emulsion to be sampled controls the amount of light passing through the film and reaching the photocells 20. The output of the photocells is therefore proportional to the light reaching its input, and is connected through an amplitude controlling potentiometer 154 to the input signal grid of the D.C. amplifier tube 100. An amplified output signal potential is therefore applied through the plate of the amplifier 100 and through the resistor 156 to the input signal grid 158 of the differential amplifier tube 102. The amplifier tube 102 constitutes a cathode follower amplifier stage with the cathodes following the grids in voltage. Therefore, the control grid 160 of the tube 102 is connected through a resistor 162 and a null control potentiometer 164 to the plate circuit of the tube. The potentiometer 164 is thereby regulated with the exciter lamp 18 on a blank runner in the film gate of the light evaluating unit so that an output will appear in the cathode circuit only in response to detection of an image frame portion of the film 10. The cathode output of the differential amplifier tube 102 is therefore applied by the lines 166 and 168 to the voltage sampling volt meter 26.

It will therefore be apparent, that the film evaluating unit will respond to the presence of light passing only through the image frame in order to apply volt meter driving voltage to the volt meter coil 170 in accordance with the opacity of the image frame portion of the film in order to displace the voltmeter contact arm 76 to a circuit closing position in contact with one of the plurality of mutually insulated segments each proportioned in area to the $f$ stop number of the shutter control mechanism associated with the printer. The volt meter contact arm 76 being so displaced stops at its position after which the momentary switch 140 opens so that the contact arm 76 remains clamped in said position upon movement of the segments 28 out of contact therewith on deenergization of the motor device 144.

At the same time, the scanner contact arm 70 which has been sweeping across corresponding contact segments 74 will establish a circuit when it moves across a corresponding contact segment and remains in position upon opening of switch 140. A circuit is thereby closed through connection to the D.C. supply lines 124 and 126. Upon energization of the relay coil 172 the relay switch 174 closes to energize the control relay coil 176 whereupon the normally closed relay switches 136 and 138 open to disconnect the stator winding of the Selsyn motors and to close the control circuit energized by the control circuit including the clutch disengaging solenoid 146 and brake engaging solenoid 148 energized by the battery 150. Accordingly, the clutch 66 is disengaged so as to remove control over the exposure control mechanism and at the same time apply the brake mechanism 38 thereto. After the image frame has passed the printing station, the system will set for a new cycle of operation upon initiation by another notch 40 on the film.

Summarizing the operation of the exposure control system hereinbefore described, it will be apparent that the film to be printed must be especially prepared with a predetermined length of blank leader between the image frames and notches at the edge at proper locations relative to the start of each scene to be printed. The film is then threaded through the opacity sensing apparatus and the film printing machine which is placed in operative condition. The power supply is then turned on so that when the film edge notch aproaches the film evaluation apparatus, a switch will be actuated to render the scanner mechanism and signal responsive components operative. The contact making volt meter indicator arm will then be driven to an angular position representative of the opacity of the image frame evaluated and held in a position in contact with a contact making segment. At the same time, the motor driven scanning arm 70 will be searching for an operative contact established by the volt meter contact arm whereupon closing of the voltmeter established circuit stops the scanning arm and also operation of the Selsyn motor system which has been operating simultaneously with the movement of the scanning arm. The brake mechanism is simultaneously applied to lock the exposure control mechanism at its proper setting. The exposure control mechanism is so held in this position until the next scene is to be evaluated.

The foregoing is considered as illustrative only of the principles of the invention. Further since, numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a printer for individual image frames on a strip of film continuously fed between an evaluation station and a printing station, said printer having exposure varying mechanism positionable at a plurality of settings; an exposure control system for obtaining prints of uniform density from image frames of varying opacity comprising, opacity evaluation means operative only in response to passage of an image frame therethrough during a sampling cycle for producing an output signal at an energy level reflecting the relative opacity of said image frame, scanning means operatively connected to said exposure varying mechanism for continuous variation thereof between said plurality of settings during said sampling cycle, signal responsive means operatively interconnecting said opacity evaluation means and scanning means to disable operation of said scanning means at one of said plurality of settings of the exposure varying mechanism predetermined by the energy level of the output signal received from the opacity evaluation means, and holding means operatively connected to said scanning means and rendered operative by said output signal disabling operation of the scanning means to hold the exposure varying mechanism at said predetermined setting until another image frame approaches the evaluation station.

2. The combination of claim 1 including time delay means responsive to movement of said film for intermittently rendering said scanning means operative only during said sampling cycle when each image frame is moved between said evaluation and printing stations.

3. The combination of claim 2, wherein said opacity evaluation means comprises a constant source of light traversing said film, light sensing means responsive to light of varying intensity transmitted through said film to produce a variable output potential, and amplifier means operatively connected to said light sensing means and responsive to output potentials in excess of a predetermined value to produce said output signal in response to light transmitted only through image frames on the film.

4. In combination with a printer for individual image frames on a strip of film continuously fed between an evaluation station and a printing station, said printer having exposure varying mechanism positionable at a plurality of settings; an exposure control system for obtaining prints of uniform density from image frames of varying opacity comprising, opacity evaluation means operative only in response to passage of an image frame therethrough on the film for producing an output signal at an energy level reflecting the relative opacity of said image frame, scanning means operatively connected to said exposure varying mechanism intermittently operative for continuous variation thereof between said plurality of settings, signal responsive means operatively interconnecting said opacity evaluation means and scanning means to disable operation of said scanning means at one of said plurality of settings of the exposure varying mechanism predetermined by the energy level of the output signal received from the opacity evaluation means, holding means operatively connected to said scanning means and rendered operative by said output signal to hold the exposure varying mechanism at said predetermined setting until another image frame approaches the evaluation station, and time delay means responsive to movement of said film for intermittently rendering said scanning means operative only during movement of each image frame between said evauation and printing stations, said opacity evaluation means comprising a constant source of light traversing said film, light sensing means responsive to light of varying intensity transmitted through said film to produce a variable output potential, and amplifier means operatively connected to said light sensing means and responsive to output potentials in excess of a predetermined value to produce said output signal in response to light transmitted only through image frames on the film, said scanning means comprising, self-synchronizing motor means operatively connected to said exposure varying mechanism for movement thereof, sweeping contact means driven by said motor means for transmitting said output signal to the signal responsive means and disengageable drive means drivingly connecting said sweeping contact means to the motor means.

5. The combination of claim 4 wherein said signal responsive means comprises, voltage sampling means displaceable by an amount that is a predetermined function of said energy level of said output signal to a circuit-closing position, graduated contact means operatively engageable by said scanning means and voltage sampling means having a plurality of separate contact ranges corresponding to said plurality of settings of the exposure varying mechanism, and relay circuit means energized in response to simultaneous engagement of the voltage sampling means and scanning means with one contact range of the contact means to disable said scanning means by disengagement of the disengageable drive means and disconnection of said motor means.

6. The combination of claim 5, wherein said holding means comprises brake means operatively connected to said scanning means to lock the exposure varying mechanism, separate power means operatively conditioned by said time delay means to energize said brake means and circuit closing means actuated by said signal responsive means to render said power means operative.

7. The combination of claim 1, wherein said opacity evaluation means comprises a constant source of light traversing said film, light sensing means responsive to light of varying intensity transmitted through said film to produce a variable output potential, and amplifier means operatively connected to said light sensing means and responsive to output potentials in excess of a predetermined value to produce said output signal in response to light transmitted only through image frames on the film.

8. In combination with a printer for individual image frames on a strip of film continuously fed between an evaluation station and a printing station, said printer having exposure varying mechanism positionable at a plurality of settings; an exposure control system for obtaining prints of uniform density from image frames of varying opacity comprising, opacity evaluation means operative only in response to passage of an image frame therethrough on the film for producing an output signal at an energy level reflecting the relative opacity of said image frame, scanning means operatively connected to said exposure varying mechanism intermittently operative for continuous variation thereof between said plurality of settings, signal responsive means operatively interconnecting said opacity evaluation means and scanning means to disable operation of said scanning means at one of said plurality of settings of the exposure varying mechanism predetermined by the energy level of the output signal received from the opacity evaluation means, and holding means operatively connected to said scanning means and rendered operative by said output signal to hold the exposure varying mechanism at said predetermined setting until another image frame approaches the evaluation station, wherein said scanning means comprising, self-synchronizing motor means operatively connected to said exposure varying mechanism for movement thereof, sweeping contact means driven by said motor means for transmitting said output signal to the signal responsive means and disengageable drive means drivingly connecting said sweeping contact means to the motor means.

9. The combination of claim 8 wherein said signal responsive means comprises, voltage sampling means displaceable by an amount that is a predetermined function of said energy level of said output signal to a circuit-closing position graduated contact means operatively engageable by said scanning means and voltage sampling means having a plurality of separate contact ranges corresponding to said plurality of settings of the exposure varying mechanism, and relay circuit means energized in response to simultaneous engagement of the voltage sampling means and scanning means with one contact range of the contact means to disable said scanning means by disengagement of the disengageable drive means and disconnection of said motor means.

10. The combination of claim 9, wherein said holding means comprises, brake means operatively connected to said motor means to lock the exposure varying mechanism, separate power means operatively conditioned in delayed response to movement of the film to energize said brake means and circuit closing means actuated by said relay circuit means to render said power means operative.

11. In combination with a printer for individual image frames on a strip of film continuously fed between an evaluation station and a printing station, said printer having exposure varying mechanism positionable at a plurality of settings; an exposure control system for obtaining prints of uniform density from image frames of varying opacity comprising, opacity evaluation means operative only in response to passage of an image frame therethrough on the film for producing an output signal at an energy level reflecting the relative opacity of said image frame, scanning means operatively connected to said exposure varying mechanism intermittently operative for continuous variation thereof between said plurality of settings, signal responsive means operatively interconnecting said opacity evaluation means and scanning means to disable operation of said scanning means at one of said plurality of settings of the exposure varying mechanism predetermined by the energy level of the output signal received from the opacity evaluation means, and holding means operatively connected to said scanning means and rendered operative by said output signal to hold the exposure varying mechanism at said predetermined setting until another image frame approaches the evaluation station, time delay means responsive to movement of said film for intermittently rendering said scanning means operative only during movement of each image frame between said evaluation and printing stations, said holding means comprising brake means operatively connected to said scanning means to lock the exposure varying mechanism, separate power means operatively conditioned by said time delay means to energize said brake means and circuit closing means actuated by said signal responsive means to render said power means operative.

12. In combination with a printer having a multiposition shutter mechanism for adjusting exposure of negatives intermittently fed thereto by a continuously moving strip, means for automatically resetting the shutter mechanism in accordance with negative opacity to obtain prints of uniform density comprising, negative evaluation means spaced from the printer for measuring the opacity of the negatives prior to arrival thereof at the printer, scanning means rendered operative for continuously adjusting the shutter mechanism during sampling cycles of variable duration, means operatively connected to the scanning means for restricting operation thereof to the sampling cycle in response to movement of each negative through the evaluation means, and means responsive to opacity measurements of the evaluation means for terminating the sampling cycles prior to arrival of the negatives at the printer by stopping operation of the scanning means and the shutter mechanism at reset positions corresponding to said opacity measurements.

13. In combination with an adjustable shutter mechanism for obtaining prints of uniform density from negatives of varying opacity being continuously advanced by a moving strip, opacity evaluation means for producing signals representative of the opacity of said negatives being advanced therethrough, shutter adjusting means for continuously adjusting the shutter mechanism during advancement of the negatives through the evaluation means, and means responsive to dispatch of said signals from the evaluation means for stopping adjustment of the shutter mechanism at reset positions corresponding to said signals.

14. The combination of claim 13 wherein said means responsive to dispatch of the signals from the evaluation means comprises, a voltage sampling volt meter for measuring the level of said signals, segmental contact means operatively engageable with said voltmeter for selecting one of a plurality of circuit connections in accordance with the level of said signals and circuit means for temporarily disabling the shutter adjusting means when completed by said one of the circuit connections selected by the contact means.

15. The combination of claim 14 wherein said shutter adjusting means comprises, scanner drive means rendered operative simultaneously with the volt meter for continuously changing the circuit connection to which the circuit means is connected, and electrical motor means for reproducing movement of the scanner drive in the shutter mechanism.

References Cited by the Examiner
UNITED STATES PATENTS

| | | | |
|---|---|---|---|
| 1,312,289 | 8/19 | Wenderhold | 88—24 |
| 1,856,859 | 5/32 | Whitson | 95—757 |
| 2,227,987 | 1/41 | Tuttle | 88—24 |
| 2,243,048 | 5/41 | Foster | 88—24 |
| 2,492,685 | 12/49 | Coroniti | 88—24 |
| 2,794,366 | 6/57 | Canaday | 88—24 |
| 2,928,327 | 3/60 | Blackmer | 95—75 |

NORTON ANSHER, *Primary Examiner.*

JOHN M. HORAN, *Examiner.*